(12) United States Patent
Li et al.

(10) Patent No.: US 11,548,025 B2
(45) Date of Patent: Jan. 10, 2023

(54) REAL-TIME MEASUREMENT SYSTEM AND METHOD FOR HEIGHT FROM SPRAY BOOM TO CROP CANOPY

(71) Applicant: Jiangsu University, Jiangsu (CN)

(72) Inventors: Jinyang Li, Jiangsu (CN); Jing Xu, Jiangsu (CN); Xinhua Wei, Jiangsu (CN); Hongwei Sun, Jiangsu (CN)

(73) Assignee: Jiangsu University, Jiangsu (CN)

( * ) Notice: Subject to any disclaimer, the term of this patent is extended or adjusted under 35 U.S.C. 154(b) by 592 days.

(21) Appl. No.: 16/475,521

(22) PCT Filed: Jul. 13, 2018

(86) PCT No.: PCT/CN2018/095533
§ 371 (c)(1),
(2) Date: Jul. 2, 2019

(87) PCT Pub. No.: WO2019/218446
PCT Pub. Date: Nov. 21, 2019

(65) Prior Publication Data
US 2021/0354159 A1    Nov. 18, 2021

(30) Foreign Application Priority Data

May 15, 2018    (CN) .......................... 201810463968.6

(51) Int. Cl.
*A01M 7/00*    (2006.01)
*B05B 12/12*    (2006.01)
(Continued)

(52) U.S. Cl.
CPC ......... *B05B 12/124* (2013.01); *A01M 7/0089* (2013.01); *G01S 7/521* (2013.01); *G01S 15/08* (2013.01)

(58) Field of Classification Search
CPC ...... B05B 12/124; B05B 1/20; A01M 7/0089; G01S 7/521; G01S 15/08; G01S 15/88; G01B 17/00
(Continued)

(56) References Cited

U.S. PATENT DOCUMENTS

2011/0282554 A1\* 11/2011 Keye ................... A01M 7/0057
                                                          701/49
2016/0084635 A1   3/2016 Pittman et al.
2020/0045953 A1\* 2/2020 Serrat ................. A01M 9/0092

FOREIGN PATENT DOCUMENTS

CN    103293156 A    9/2013
CN    103798217 A    5/2014
(Continued)

OTHER PUBLICATIONS

Farooque, et al., "Performance evaluation of multiple ground based sensors mounted on a commercial wild blueberry harvester to sense plant height, fruit yield and topographic features in real-time," Computers & Electronics in Agriculture, 2013, 91:135-144.
(Continued)

*Primary Examiner* — Richard Tan
(74) *Attorney, Agent, or Firm* — Greenberg Traurig, LLP

(57) ABSTRACT

A kind of real-time measurement system and method for height from spray boom to crop canopy was provided in present invention patent, which includes the following steps. Step 1: Calibration for ultrasonic ranging sensor; Step 2: Determination of included angle for two ultrasonic ranging sensors; Step 3: Collection of relative height between spray boom and crop canopy; Step 4: Anti-interference processing for height data; Step 5: Calculation of relative height from spray boom to crop canopy. Its characteristic lies in: two ultrasonic ranging sensors with a certain angle are installed at each end of the spray boom, the height of crop canopy was acquired under the control of control unit, and the relative
(Continued)

height from spray boom to crop canopy was obtained by the anti-interference analysis and data conversion, the accurate monitoring for relative height from spray boom to crop canopy was realized while the spray boom is tilted. It breaks through the technical bottleneck that the relative height of the spray boom and the crop canopy cannot be accurately obtained when the spray boom tilts due to turbulence in the field operation of the spray boom sprayer, and lays a technical foundation for the dynamic adjustment of the balance and height of the spray boom.

9 Claims, 2 Drawing Sheets

(51) Int. Cl.
  *G01S 7/521* (2006.01)
  *G01S 15/08* (2006.01)
(58) Field of Classification Search
  USPC .......................................................... 47/1.7
  See application file for complete search history.

(56) References Cited

FOREIGN PATENT DOCUMENTS

CN    104663637 A    6/2015
CN    108489432 A    9/2018

OTHER PUBLICATIONS

Hämmerle, et al., "Direct derivation of maize plant and crop height from low-cost time-of-flight camera measurements," Plant Methods, 2016, 12:1-13.

Zhang, et al., "A LIDAR-based crop height measurement system for Miscanthus giganteus," Computers & Electronics in Agriculture, 2012, 85:70-76.

Wang et al., "Design and experiments on boom height adjusting system", Journal of Agricultural Mechanization Research 2014(8):161-164.

Pan et al., "Design and experiments on boom height automatic adjusting system", Journal of Agricultural Mechanization Research 2017(11):107-111.

* cited by examiner

REAL-TIME MEASUREMENT SYSTEM AND METHOD FOR HEIGHT FROM SPRAY BOOM TO CROP CANOPY

CROSS REFERENCE TO RELATED APPLICATION

The present application is a 371 U.S. National Stage of International Application No. PCT/CN2018/095533, filed Jul. 13, 2018, which claims the benefit of the earlier filing date of Chinese Patent Application No. 201810463968.6 filed on May 15, 2018, which are each incorporated herein by reference in their entirety.

TECHNOLOGY FIELD

The invention for a kind of real-time measurement system and method for height from spray boom to crop canopy belongs to intelligent agricultural equipment field.

BACKGROUND OF THE INVENTION

The sprayers with 6-12 meters spray booms are now available and dominant on the market in China, which the limited spray width leads to low spray efficiency on the one hand; on the other hand, there are many trips back and forth in the field resulting in large damage to crops from sprayer tires when the sprayers operate in a certain operating area. With the rapid land circulation and the development demand of large-scale planting in China, the sprayer with a width of more than 24 m springs up like mushrooms on the market. However, a new problem is caused by these large wide working width sprayer. It is inevitable that the vibration and inclination of spray boom caused by the ground unevenness when spray-rod sprayer works in the field. Thus a small inclination angle of spray boom probably results in the contact of the ends of spray boom with ground and as a result of the break or bend of spray boom. Moreover, the inclination of spay boom may also scratch the crops. In practical field operations, the spray boom must be parallel to the crop canopy and keep a certain height to improve the uniformity of droplet deposition and prevent droplet drift. Therefore, it is necessary to conduct the stable, precise and dynamic measurement for relative height from sprayer nozzles to crop canopy and active control of spray balance to improve spray quality and avoid spray boom damage. The dynamic monitoring for the relative height between spray boom and crop canopy is the premise and key to realize stable and precise control for spray boom.

In available technologies, patent 1 (Application No. 20150079697.0) discloses a kind of spray boom balance and automatic height adjustment device and methods. The relative height between spray boom and ground was measured by ultrasonic ranging sensors. Since the ground is relatively flat, the spray rod height to the ground is easy to measure. The canopy is undulating due to the uneven growth of crops. The measurement accuracy was objectively affected by crop variety, planting density, wind velocity and travelling speed of sprayer, the appropriate anti-interference processing for collected height data is necessary to obtain the effective height data. In addition, sensors inclined with the spray boom because the sensors was vertically mounted on the spray boom, the vertical height from spray boom to ground cannot be obtained. Therefore, the device and method for spray boom balancing and automatic height adjustment published in Patent 1 cannot be used for real-time measurement of crop canopy height.

A sprayer with active balance spray boom was disclosed in patent 2 (Application No. 201010603644.1). During spraying, the controller detected the horizontal angle of the spray boom according to the inclination sensor, so as to judge the balance of the spray rod. However, this device and method cannot realize the real-time measurement height from spray boom to crop canopy.

Three-stage automatic adjusting booms were designed to keep the spray height along with the change of undulating field ground during spraying operation (Wang Songlin, Zhao Chunjiang, Wang Xiu. Design and experiments on boom height adjusting system. Journal of Agricultural Mechanization Research, 2014(8):161-164). The height from spray boom and ground was detected by three touch sensors which installed in three-stage booms. The boom height was adjusted by the controller based on controlling for hydraulic cylinder. This system can effectively adjust the boom posture and make the spray boom keep a certain height. However, this device can cause the crop damage because the height detection is based on the contacts between used sensors and crop. Moreover, system reliability is decreased when small crops or ground is just under the contact sensors.

An ultrasonic ranging sensor was installed on blueberry harvester to realize real-time detection for plant height (Farooque A A, Chang Y K, Zaman Q U, et al. Performance evaluation of multiple ground based sensors mounted on a commercial wild blueberry harvester to sense plant height, fruit yield and topographic features in real-time. Computers & Electronics in Agriculture, 2013, 91:135-144). Although the plant height of blueberry can be effectively detected when the field ground is flat, the obtained plant height data has a large error and cannot be used for the effective detection of plant height when the ground has a certain inclination angle.

An automatic adjusting system on boom height was designed to improve uniformity of droplet deposition and avoid scratching crops during spraying operations (Pan Fochu, Deng Fudong, Wen Haojun. Design and experiments on boom height automatic adjusting system. Journal of Agricultural Mechanization Research, 2017(11):107-111). The ultrasonic ranging sensors and inclination sensors were adopted to collect distance between boom and ground and inclination angle of spray boom. Although the measurement result was better than that of ultrasonic measurement alone, the distance between boom and crop canopy was not obtained.

The 3D camera was used to measure the plant height (Martin Hammerlel, Bernhard Hale. Direct derivation of maize plant and crop height from low-cost time-of-flight camera measurements. Plant Methods, 2016, 12:1-13), but the processing of time image data was time-consuming and thus real-time performance was poor.

Laser radar is used to measure the relative height from spray boom to crop canopy (Zhang, Lei; Grift, Tony E. A LIDAR-based crop height measurement system for Miscanthus giganteus. Computers & Electronics in Agriculture, 2012, 85:70-76.). However, the lidar used in this study is expensive and low in cost performance.

SUMMARY OF THE INVENTION

To compensate the shortcomings of available technology nowadays, a kind of real-time measurement system and method for height from spray boom to crop canopy was provided in this invention. The objective is to realize the dynamic collection of relative height between spray boom and crop canopy during working process of sprayer and laying the foundation for dynamic adjustment of relative height between spray boom and crop canopy and boom balance.

In order to solve the above technical problems, the specific technical scheme of the invention is as follows:

A kind of real-time measuring system for relative height from spray boom to crop canopy includes spray boom, sensing unit and control unit.

The described the sensing unit fixed on the spray boom by the sensing unit supporting frame, the sensing unit supporting frame including the sensor fixed frame, sensor installation height adjustment and lock nut A, sensor installation angle adjusting mechanism and the lock nut B.

A sensor unit was set on each end of spray boom, respectively. A sensor unit comprises of support frame for sensing unit and sensor group, the described sensor group includes two ultrasonic ranging sensors with the centerline having a certain angle; More specifically, the ultrasonic ranging sensor A and ultrasonic ranging sensor B locate on one end of the spray boom and ultrasonic ranging sensor C and ultrasonic ranging sensor D locate on the other side of the spray boom; a sensor unit and control unit are connected, which used to collect signal from sensor unit and calculate the real-time distance of spray boom relative to the crop canopy.

The described sensing unit fixed on the spray boom by the sensing unit supporting frame, the sensing unit supporting frame comprised of the sensor fixed frame, sensor installation height adjustment and lock nut A, sensor installation angle adjusting mechanism and the lock nut B.

There are two sensor fixed frames with same 'T' shape, which are made of 304 stainless steel plate with a thickness of 4 mm. One end is machined with two mounting holes with a center distance of 40 mm and a diameter of 10 mm, which are used to fix the sensing unit to the spray boom through bolts. On the other hand, two mounting holes (70 mm from the center and 10 mm in diameter) are machined at the other end of the sensor fixed frame, through which the sensor installation angle adjusting mechanism is bolted to the sensor fixed frame.

The number of the sensor installation angle adjusting mechanism (6) with "[" type bending is four, the sensor mounting holes with 30 mm diameter on one end of each bending were used to install ultrasonic distance sensors A, B, C and D. At the other end there are 10 mm diameter holes, which used to bolt connection with 10 mm mounting holes in sensor mounting frame. When adjusting the angle between two ultrasonic ranging sensors, the lock nut B is loosen and then rotate the sensor installation angle adjusting mechanism. The sensor installation angle adjusting mechanism is locked by lock nut B after the angle is adjusted to the target value.

The described control unit comprises controller, analogue data acquisition module, ultrasonic ranging sensor A, ultrasonic ranging sensor B, ultrasonic ranging sensor C, ultrasonic ranging sensor D, USB flash disk, touch screen, DC booster module and 12 V DC power.

The described sensor group comprised of ultrasonic ranging sensor A and ultrasonic ranging sensor B, ultrasonic ranging sensor C and ultrasonic ranging sensor D. After these four ultrasonic ranging sensors are mounted to the sensor installation angle adjusting mechanism and the height is adjusted to the target value, these four ultrasonic ranging sensors are locked by the sensor installation height adjusting mechanism and lock nut B.

The described ultrasonic ranging sensor A and ultrasonic ranging sensor B, ultrasonic ranging sensor C and ultrasonic ranging sensor D are UC2000-30GM-IUR2-V15 sensors from PEPPERL+FUCHS company. Each ultrasonic ranging sensor was machined external thread. The ultrasonic ranging sensor passed through sensor mounting holes 30 mm in diameter in the sensor installation angle adjusting mechanism, the two ends of sensors were locked by sensor installation height adjustment and lock nut A.

The controller 8 and the analog data acquisition module 9 are used for parallel communication, the RS485 interface 10 of controller 8 is connected with touch screen 11, touch screen 11 connects with USB flash disk 12, 12 V DC power 22 connects with controller 8 through DC booster module 21 and provides power for analog data acquisition module 9, four A/D conversion interfaces are linked to four ultrasonic ranging sensors, respectively.

The described control unit comprised of controller, analog data acquisition module, ultrasonic ranging sensor A and ultrasonic ranging sensor B, ultrasonic ranging sensor C ultrasonic ranging sensor D, USB flash disk, touch screen, DC booster module and 12V DC power.

The described controller was 6ES7 216-2BD23-0XB8 of Siemens, which integrated RS485 interface. The controller was connected with analog data acquisition module by PPI extension connection cable.

The described analog data acquisition module was 6ES7 235-0KD22-0XB8 of Siemens, which integrated A/D conversion interface A, A/D conversion interface B, A/D conversion interface C and A/D conversion interface D.

The described touch screen was Smart IE 700 V3 of Siemens, which integrated RS485 communication interface and USB interface, RS485 Bus of the touch screen connected with RS485 interface of controller. The touch screen was used to display the height data collected in real time and to set the target value of relative height between spray boom and crop canopy.

The described USB flash disk, which was used to memory the height data of spray boom, was connected with touch screen by USB interface integrated in touch screen.

The described ultrasonic ranging sensor A and ultrasonic ranging sensor B, ultrasonic ranging sensor C and ultrasonic ranging sensor D were connected with A/D conversion interface A, A/D conversion interface B, A/D conversion interface C and A/D conversion interface D of analog data acquisition module, respectively.

The described 12V DC power is the lead-acid battery in boom sprayer, the 12V DC voltage from battery was converted to 24V DC voltage by DC booster module and supplied power for ultrasonic ranging sensor A and ultrasonic ranging sensor B, ultrasonic ranging sensor C, ultrasonic ranging sensor D, controller and touch screen.

The described DC booster module is MDF150-12524 boost converter.

A kind of real-time height measuring method for spray boom relative to crop canopy, its feature lies in including the following steps:

Step 1: calibration for ultrasonic ranging sensors: the applied ultrasonic ranging sensors are accurately calibrated according to the practical measured height data within a certain range from the measured spray boom to crop canopy.

Step 2: Determination of included angle for two ultrasonic ranging sensors.

Step 3: Collection of relative height between spray boom and crop canopy.

After the spray boom sprayer is driven to the field, the ultrasonic ranging sensors A (14), B (16), C (19) and D (20) are directed at crop rows, the start control unit (3), under the different wind speed and walking speed, different planting density and two different kinds of crops which one kind is the crop with slender crops such as wheat, rice and the other kind is broad leaf crops such as corn, soybean and so on. The height from spray boom to crop canopy is collected and stored in the USB flash disk (12) for subsequent anti-interference processing to data, as well as the measurement by crop canopy height using artificial measure and record the measured values; meanwhile the crop canopy height was manually measured and the measured values were recorded.

Step 4: Anti-interference processing for height data.

Filter analysis for the acquired height data in step 3 was conducted by applying limiting filtering, median filtering and sliding average filtering. The singular value of the data collected due to the sensor alignment with the empty space and other interference in the operation process of the sprayer is removed to obtain reliable and real effective data.

Step 5: Calculation of relative height from spray boom to crop canopy.

The field ground turbulence causes spray boom (1) tilt when sprayer works in fields, the distance from ultrasonic ranging sensors is not the relative height of crop canopy to spray boom, therefore, it is necessary to transform the collected data by ultrasonic ranging sensors into the relative height between spray boom and crop canopy through certain operations, the specific transformation algorithm is as follows:

$$h1 = S1 \cos\alpha = S2 \cos(\alpha-\theta) \quad (1)$$

$$h2 = S3 \cos\alpha = S4 \cos(\alpha-\theta) \quad (2)$$

where $\theta$ is the angle between two sensors; $\alpha$ the tilt angle of spray boom (1); S1, S2, S3, and S4 are the valid data from ultrasonic ranging sensors A (14), B (16), C (19) and D (20) respectively; h1 and h2 are the relative height of canopy to left and right ends of spray boom, respectively.

It can be obtained from equations (1) and (2):

$$\alpha = \arctan\frac{S2\cos\theta - S1}{S2\sin\theta} \text{ or} \quad (3)$$

$$\alpha = \arctan\frac{S3 - S4\cos\theta}{S4\sin\theta} \quad (4)$$

By substituting equations (3) and (4) into equations (1) and (2), the values of h1 and h2 can be described as $$h1 = S1 \cos\alpha$$

$$h2 = S3 \cos\alpha$$

The described step 1 including the following steps:

1.1) Fix the ultrasonic ranging sensors A (14), B (16), C (19) and D (20) will be calibrated on shelf bracket, respectively; Then the triangular bracket is placed on the horizontal ground so that the sensor is perpendicular to the vertical wall.

1.2) Started from 200 mm at 10 mm intervals until 800 mm, adjust the distance between the ultrasonic transmission terminal of the ultrasonic ranging sensors and vertical metope, and meanwhile manually recorded the distance from ultrasonic transmission terminal of the ultrasonic ranging sensors to vertical metope with tape measure, after being adjusted distance, the control unit (3) was run for the data acquisition, and digital quantity corresponding to the distance was recorded.

1.3) Started from 800 mm at 10 mm intervals until 200 mm, adjust the distance between the ultrasonic transmission terminal of the ultrasonic ranging sensors and vertical metope, and meanwhile manually recorded the distance from ultrasonic transmission terminal of the ultrasonic ranging sensors to vertical metope with tape measure, after being adjusted distance, the control unit (3) was run for the data acquisition, and digital quantity corresponding to the distance was recorded.

1.4) by averaging the two values of digital quantity from each measurement points from steps 1.2) and 1.3), the fitting data can be obtained.

1.5) data fitting was conducted, with minimum variance, by using the fitting data in step 1.4) and manually recording data in steps1.2) and 1.3) and the fitted equation was obtained.

1.6) the verification for fitting equation obtained in step 1.5 was carried out by data point selecting randomly in 200-800 mm. The minimum and the maximum errors were 0 mm and 6 mm, respectively.

The described step 2 compose the following steps: fixed the ultrasonic ranging sensors A (15), B (16), C (19) and D (20) on spray boom (1), respectively. The sensors was aligned with the flat cement pavement, and the distance from the lower end face of the sensor to the cement ground is measured with a tape measure. Then run the control unit (3) for height collection. The acquired data were displayed on touch screen (11) and stored in USB flash disk (12), by observing the collected height e data on the touch screen (11), and compared with manually measuring distance with tape measure, it can be regard as the angle between two adjacent ultrasonic ranging sensors is too small if the difference is bigger. The reason of larger measurement error is probably that the ultrasonic waves sent by one sensor were directly received by the other sensor and without ground reflection.

After sheltering from one ultrasonic ranging sensor, compare the height data from the other ultrasonic sensor data, which display on the touch screen (11), with the real height value of manual measurement. If the measured values are close to real height values, it can be regarded as the angle between two sensors was too small and it is necessary to loosen lock nut (7) and then rotate the sensor installation angle adjusting mechanism (6) to increase the angle of two sensors. While adjusting, it is necessary to notice that keep the angle between the centerlines of two sensors with the plumb line as possible as can until the data from two ultrasonic ranging sensors are both close to the real measured values. Thus, record the angle between two sensors at this time and lock the sensor installation angle adjusting mechanism (6) by lock nut (7).

The beneficial effect of the present device includes (1) The sensing range of the sensor was enlarged by installing two ultrasonic ranging sensors with a certain angle on both ends of spray boom. Under the action of control unit, the height of crop canopy was effectively collected. The relative height from the spray boom to crop canopy was obtained through anti-interference analysis and conversion of data, which realized the accurate monitoring for relative height from the spray boom to crop canopy while spray boom was tilting. It breaks through the technical bottleneck that the relative height between the spray boom and the crop canopy cannot be accurately obtained when the spray boom tilts due to ground turbulence during working operations of sprayer, and lays a technical foundation for the dynamic adjustment of the balance and height of the spray boom.

The beneficial effect of the present device also includes (2) A kind of real-time measurement system and method for height from spray boom to crop canopy possesses wide application range and can be installed into the existing spray boom sprayer use only through the bolt.

1—spray boom; 2—sensing unit; 3—control unit; 4—sensor fixed frame; 5—sensor installation height adjustment and lock nut A; 6—sensor installation angle adjusting mechanism; 7—lock nut B; 8—controller; 9—analog data acquisition module; 10—RS485 interface; 11—touch screen; 12—USB flash disk; 13—A/D conversion interface A; 14—ultrasonic ranging sensor A; 15—A/D conversion interface B; 16—ultrasonic ranging sensor B; 17—A/D conversion interface C; 18—A/D conversion interface D; 19—ultrasonic ranging sensor C; 20—ultrasonic ranging sensor D; 21—DC booster module; 22—12V DC power; 23—sensor group; 24—mounting hole.

DETAILED DESCRIPTION

The detailed description combined with the attached drawings for the implementation scheme of the invention was as follows.

Figure 1:
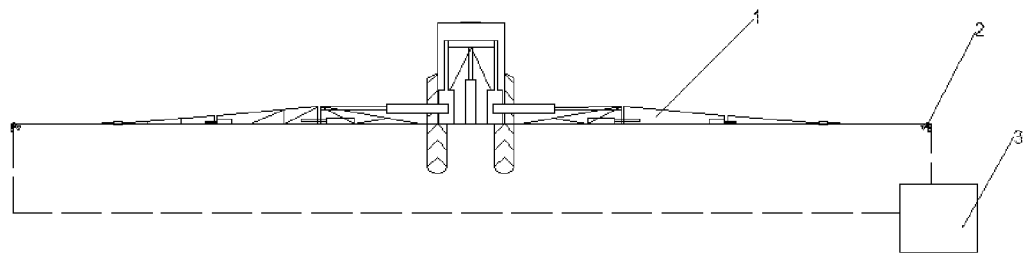
FIG. 1 Overall structure diagram of boom sprayer.

As shown in FIG. 1, a kind of real-time measuring system for relative height from spray boom to crop canopy includes spray boom 1, sensing unit 2 and control unit 3.

The described sensing unit 2 includes sensor fixed frame 4, sensor installation height adjustment and lock nut A 5, sensor installation angle adjusting mechanism 6, lock nut B 7 and sensor group 23.

A sensor unit 2 was set on each end of spray boom, respectively. A sensor unit comprises of support frame for sensing unit and sensor group 23, the described sensor group includes two ultrasonic ranging sensors with the centerline having a certain angle; More specifically, the ultrasonic ranging sensor A 14 and ultrasonic ranging sensor B 16 is on one end of the spray boom of the sensing unit of and ultrasonic ranging sensor C 19 and ultrasonic ranging sensor D 20 is on the other side of the spray boom; a sensor unit 2 and control unit 3 are connected, which used to collect signal for sensor unit, and calculate the real-time distance of spray boom relative to the crop canopy height.

Figure 2:
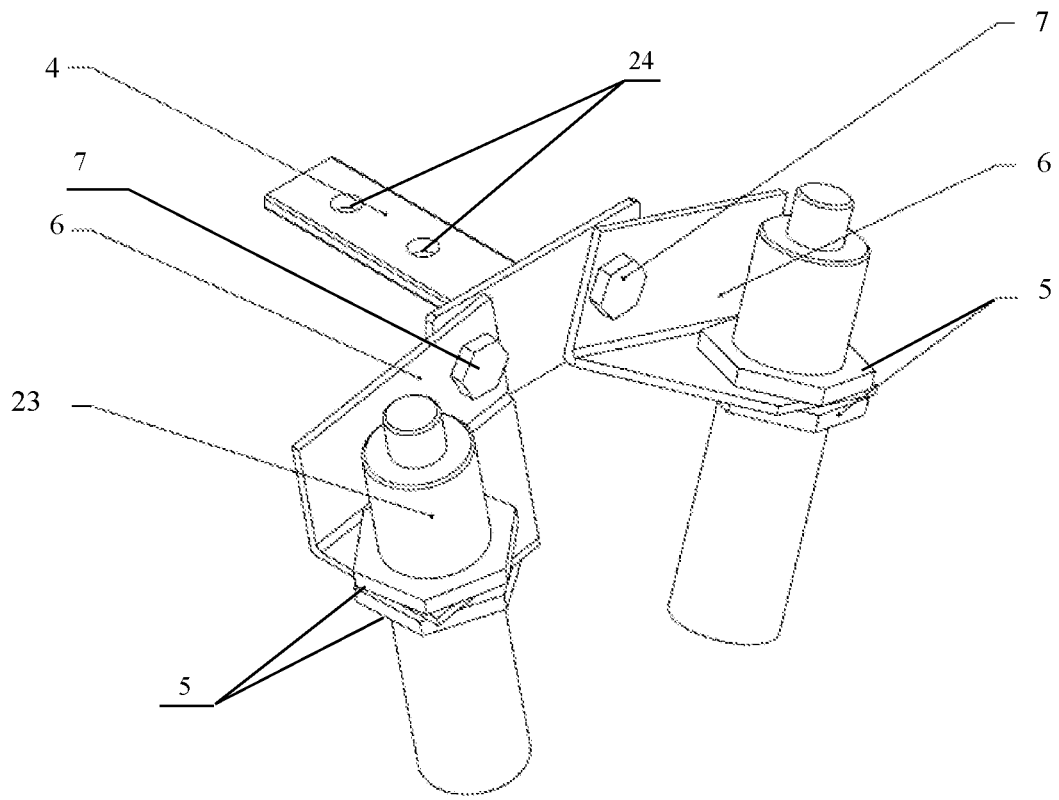
FIG. 2 Schematic diagram of sensor unit installation.

As shown in FIG. 2, the described sensing unit 2 fixed on the spray boom by the sensing unit supporting frame, the sensing unit supporting frame comprised of the sensor fixed frame 4, sensor installation height adjustment and lock nut A 5, sensor installation angle adjusting mechanism 6 and the lock nut B.

The described sensor fixed frame 4 is T-shape, the two terminals of T-shape was connected with sensor installation angle adjusting mechanism 6 by lock nut B 7; The sensor installation angle adjusting mechanism 6 can rotate around the lock nut B 7 relative to one end of the T-shape sensor fixed frame 4, the sensor mounting holes are designed on the sensor installation angle adjusting mechanism 6, the ultrasonic ranging sensors are fixed on the sensor mounting holes and can be adjusted up and down within the sensor mounting holes.

There are two sensor fixed frame 4 with same 'T' shape, which are made of 304 stainless steel plate with a thickness of 4 mm. One end is machined with two mounting holes 24 with a center distance of 40 mm and a diameter of 10 mm, which are used to fix the sensing unit 2 to the spray boom 1 through bolts. On the other hand, two mounting holes (70 mm from the center and 10 mm in diameter) are machined at the other end of the sensor mounting frame 4, through which the sensor installation angle adjusting mechanism 6 is bolted to the sensor mounting frame 4.

The number of the sensor installation angle adjusting mechanism 6 with "[" type bending is four, the sensor mounting holes with 30 mm diameter on one end of each bending were used to install ultrasonic distance sensors A 14, B 16, C 19 and D 20. At the other end there are 10 mm diameter holes, which used to bolt connection with 10 mm mounting holes in sensor mounting frame 4. When adjusted the angle between two ultrasonic ranging sensors, the lock nut B 7 is loosen and then rotate the sensor installation angle adjusting mechanism 6. The sensor installation angle adjusting mechanism 6 is locked by lock nut B 7 after the angle is adjusted to the target value.

The described sensor group 23 comprised of ultrasonic ranging sensor A 14 and ultrasonic ranging sensor B 16, ultrasonic ranging sensor C 19 and ultrasonic ranging sensor D 20. After these four ultrasonic ranging sensors were mounted to the sensor installation angle adjusting mechanism 6 and the height is adjusted to the target value, these four ultrasonic ranging sensors were locked by the sensor installation height adjusting mechanism and lock nut B 5.

The described ultrasonic ranging sensor A 14 and ultrasonic ranging sensor B 16, ultrasonic ranging sensor C 19 and ultrasonic ranging sensor D 20 were UC2000-30GM-IUR2-V15 sensors of PEPPERL+FUCHS company. Each ultrasonic ranging sensor was machined external thread. The ultrasonic ranging sensor passed through sensor mounting holes 30 mm in diameter in the sensor installation angle adjusting mechanism, the two ends of sensors were locked by sensor installation height adjustment and lock nut A 5.

Figure 3:
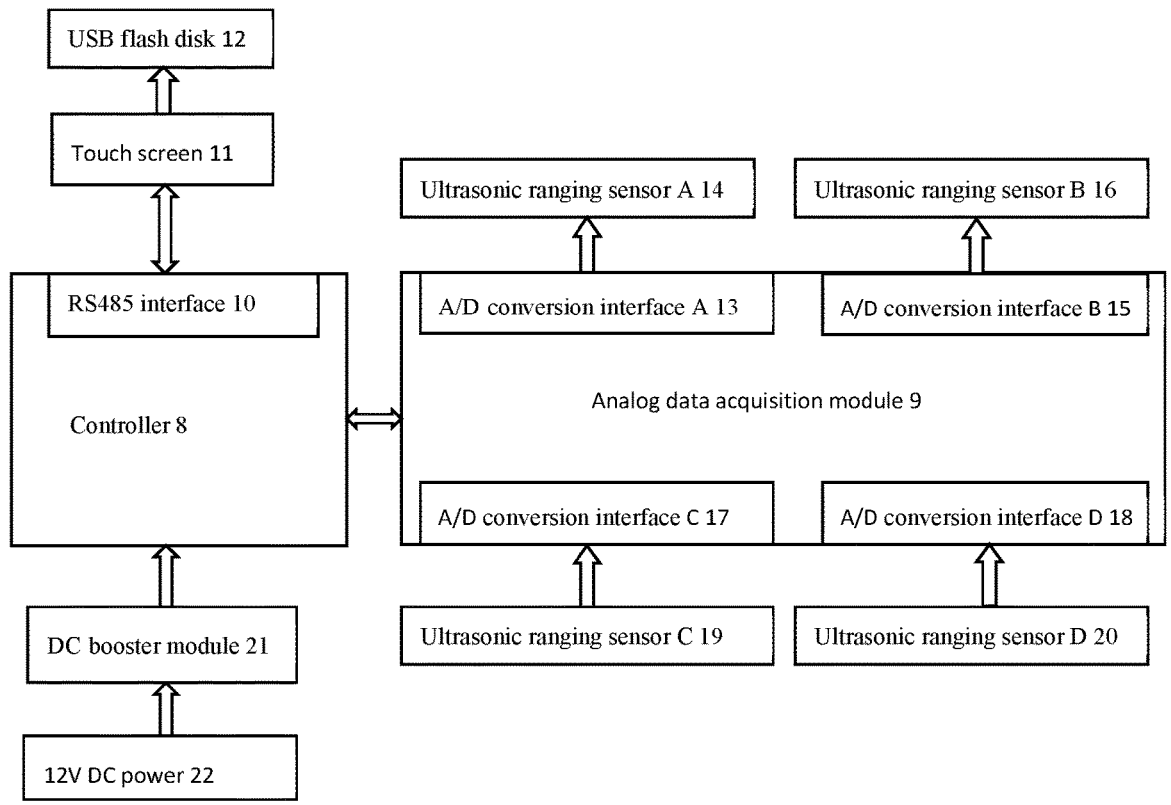
FIG. 3 Schematic diagram of control unit.
Figure 4:
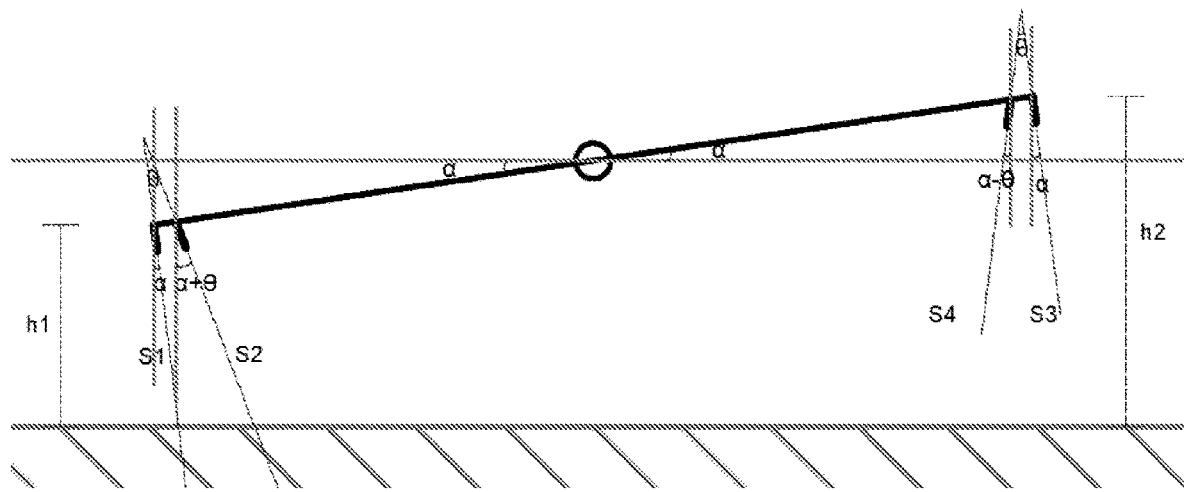
FIG. 4 Schematic diagram of sensor measurement when spray boom tilt.

As shown in FIG. 3, the described control unit 3 comprises of controller 8, analogue data acquisition module 9, ultrasonic ranging sensor A 14, ultrasonic ranging sensor B 16, ultrasonic ranging sensor C 19, ultrasonic ranging sensor D 20, USB flash disk 12, touch screen 11, DC booster module 21 and 12 V DC power 22.

The controller 8 and the analog data acquisition module 9 are used for parallel communication, the RS485 interface 10 of controller 8 is connected with touch screen 11, touch screen 11 connects with USB flash disk 12, 12 V DC power 22 connects with controller 8 through DC booster module 21 and provides power for analog data acquisition module 9, four A/D conversion interfaces are linked to four ultrasonic ranging sensors, respectively.

The described control unit comprised of controller, analog data acquisition module, ultrasonic ranging sensor A and ultrasonic ranging sensor B, ultrasonic ranging sensor C ultrasonic ranging sensor D, USB flash disk, touch screen, DC booster module and 12V DC power.

The described controller 8 was 6ES7 216-2BD23-0XB8 of Siemens, which integrated RS485 interface 10. The controller was connected with analog data acquisition module 9 by PPI extension connection cable.

The described analog data acquisition module 9 was 6ES7 235-0KD22-0XB8 of Siemens, which integrated A/D conversion interface A 13, A/D conversion interface B 15, A/D conversion interface C 17 and A/D conversion interface D 18.

The described touch screen 11 was Smart IE 700 V3 of Siemens, which integrated RS485 communication interface and USB interface, RS485 Bus of the touch screen 11 connected with RS485 interface 10 of controller. The touch screen 11 was used to display the height data collected in real time and to set the target value of relative height between spray boom and crop canopy.

The described USB flash disk, which was used to memory the height data of spray boom, was connected with touch screen by USB interface integrated in touch screen.

The described ultrasonic ranging sensor A 14 and ultrasonic ranging sensor B 16, ultrasonic ranging sensor C 19 and ultrasonic ranging sensor D 20 were connected with A/D conversion interface A 13, A/D conversion interface B 15, A/D conversion interface C 17 and A/D conversion interface D 18 of analog data acquisition module, respectively.

The described 12V DC power 22 is the lead-acid battery in boom sprayer, the 12V DC power 12 from 12V DC voltage was converted to 24V DC voltage by DC booster module 21 and supplied power for ultrasonic ranging sensor A 14 and ultrasonic ranging sensor B 16, ultrasonic ranging sensor C 17, ultrasonic ranging sensor D 20, controller 8 and touch screen 11.

The described DC booster module is MDF150-12524 boost converter.

A kind of real-time height measuring method for spray boom relative to crop canopy included the following steps:

Step 1: calibration for ultrasonic ranging sensors: the applied ultrasonic ranging sensors are accurately calibrated according to the practical measured height data within a certain range from the measured spray boom to crop canopy.

Step 2: Determination of included angle for two ultrasonic ranging sensors.

Step 3: Collection of relative height between spray boom and crop canopy.

After the spray boom sprayer is driven to the field, the ultrasonic ranging sensors A 14, B 16, C 19 and D 20 are directed at crop rows, the start control unit 3, under the different wind speed and walking speed, different planting density and two different kinds of crops which one kind is the crop with slender crops such as wheat, rice and the other kind is broad leaf crops such as corn, soybean and so on. The height from spray boom to crop canopy is collected and stored in the USB flash disk 12 for subsequent anti-interference processing to data, as well as the measurement by crop canopy height using artificial measure and record the measured values; meanwhile the crop canopy height was manually measured and the measured values were recorded.

Step 4: Anti-interference processing for height data.

Filter analysis for the acquired height data in step 3 was conducted by applying limiting filtering, median filtering and sliding average filtering. The singular value of the data collected due to the sensor alignment with the empty space and other interference in the operation process of the sprayer is removed to obtain reliable and real effective data.

Step 5: Calculation of relative height from spray boom to crop canopy.

The field ground turbulence causes spray boom 1 tilt when sprayer works in fields, the distance from ultrasonic ranging sensors is not the relative height of crop canopy to spray boom, therefore, it is necessary to transform the collected data by ultrasonic ranging sensors into the relative height between spray boom and crop canopy through certain operations, the specific transformation algorithm is as follows:

$$h1 = S1 \cos \alpha = S2 \cos(\alpha - \theta) \tag{1}$$

$$h2 = S3 \cos \alpha = S4 \cos(\alpha - \theta) \tag{2}$$

where $\theta$ is the angle between two sensors; a the tilt angle of spray boom 1; S1, S2, S3 and S4 are the valid data from ultrasonic ranging sensors A 14, B 16, C 19 and D 20 respectively; h1 and h2 are the relative height of canopy to left and right ends of spray boom, respectively.

It can be obtained from equations (1) and (2):

$$\alpha = \arctan \frac{S2\cos\theta - S1}{S2\sin\theta} \text{ or} \tag{3}$$

$$\alpha = \arctan \frac{S3 - S4\cos\theta}{S4\sin\theta} \tag{4}$$

By substituting equations (3) and (4) into equations (1) and (2), the values of h1 and h2 can be described as $$h1 = S1 \cos \alpha$$

$$h2 = S3 \cos \alpha$$

The described step 1 including the following steps:

1.1) Fix the ultrasonic ranging sensors A 14, B 16, C 19 and D 20 will be calibrated on shelf bracket, respectively; Then the triangular bracket is placed on the horizontal ground so that the sensor is perpendicular to the vertical wall.

1.2) Started from 200 mm at 10 mm intervals until 800 mm, adjust the distance between the ultrasonic transmission terminal of the ultrasonic ranging sensors and vertical metope, and meanwhile manually recorded the distance from ultrasonic transmission terminal of the ultrasonic ranging sensors to vertical metope with tape measure, after being adjusted distance, the control unit 3 was run for the data acquisition, and digital quantity corresponding to the distance was recorded.

1.3) Started from 800 mm at 10 mm intervals until 200 mm, adjust the distance between the ultrasonic transmission terminal of the ultrasonic ranging sensors and vertical metope, and meanwhile manually recorded the distance from ultrasonic transmission terminal of the ultrasonic ranging sensors to vertical metope with tape measure, after being adjusted distance, the control unit 3 was run for the data acquisition, and digital quantity corresponding to the distance was recorded.

1.4) by averaging the two values of digital quantity from each measurement points from steps 1.2) and 1.3), the fitting data can be obtained.

1.5) data fitting was conducted, with minimum variance, by using the fitting data in step 1.4) and manually recording data in steps 1.2) and 1.3) and the fitted equation was obtained.

1.6) the verification for fitting equation obtained in step 1.5 was carried out by data point selecting randomly in 200-800 mm. The minimum and the maximum errors were 0 mm and 6 mm, respectively.

The described step 2 compose the following steps: fixed the ultrasonic ranging sensors A 15, B 16, C 19 and D 20 on spray boom 1, respectively. The sensors was aligned with the flat cement pavement, and the distance from the lower end face of the sensor to the cement ground is measured with a tape measure. Then run the control unit 3 for height collection. The acquired data were displayed on touch screen 11 and stored in USB flash disk 12, by observing the collected height e data on the touch screen 11, and compared with manually measuring distance with tape measure, it can be regard as the angle between two adjacent ultrasonic ranging sensors is too small if the difference is bigger. The reason of larger measurement error is probably that the ultrasonic waves sent by one sensor were directly received by the other sensor and without ground reflection.

After sheltering from one ultrasonic ranging sensor, compare the height data from the other ultrasonic sensor data, which display on the touch screen 11, with the real height value of manual measurement. If the measured values are close to real height values, it can be regarded as the angle between two sensors was too small and it is necessary to loosen lock nut 7 and then rotate the sensor installation angle adjusting mechanism 6 to increase the angle of two sensors. While adjusting, it is necessary to notice that keep the angle between the centerlines of two sensors with the plumb line as possible as can until the data from two ultrasonic ranging sensors are both close to the real measured values. Thus, record the angle between two sensors at this time and lock the sensor installation angle adjusting mechanism 6 by lock nut 7.

The working process of this invention—a kind of real-time measurement system and method for height from spray boom to crop canopy is as follows:

Before working of prayer, the real-time measurement system was started and self-checking was conducted. The target height and height thresholds was set by using touch screen 11 after passing self-checking. Then, under the action of the controller 8, the height of one end of the spray boom relative to the crop canopy is acquired dynamically through the ultrasonic ranging sensor A 14 and the ultrasonic ranging sensor B 16, and the height of the other end of the spray boom relative to the crop canopy is obtained dynamically through the ultrasonic ranging sensor C 19 and the ultrasonic ranging sensor D 20. The practical height from spray boom to crop canopy was obtained by the anti-interference processing and data conversion of collected data and stored in USB flash disk 12 as well as displayed on touch screen 11.

The invention claimed is:

1. A real-time measuring system for relative height from a spray boom to a crop canopy comprises:
    a sensor unit set on the spray boom with a first end and a second end, the sensor unit comprising a support frame and sensor group, the sensor group comprises four ultrasonic ranging sensors, each with a centerline positioned at an angle, a first ultrasonic ranging sensor and a second ultrasonic ranging sensor of the four ultrasonic ranging sensors located on the first end of the spray boom and a third ultrasonic ranging sensor and a fourth ultrasonic ranging sensor of the four ultrasonic ranging sensors located on the second end of the spray boom; and
    the sensor unit is connected to a control unit, wherein the control unit collects signals from the sensor unit and the control unit calculates a real-time distance of the spray boom relative to the crop canopy.

2. The real-time measuring system according to claim 1 wherein
    the sensor unit being fixed on the spray boom by the support frame, the support frame comprising a fixed frame, a height adjustment mechanism connected to a first lock nut, an angle adjusting mechanism connected to a second lock nut;
    the fixed frame having a T-shape with a first frame end and a second frame end, the first frame end and the second frame end are connected with the angle adjusting mechanism and locked by the second lock nut;
    the angle adjusting mechanism rotates around the second lock nut relative to the first frame end of the fixed frame using a plurality of sensor mounting holes on the angle adjusting mechanism; and
    at least one ultrasonic ranging sensor is fixed on the plurality of sensor mounting holes and can be adjusted up and down within the sensor mounting holes.

3. The real-time measuring system according to claim 2 wherein the fixed frame is a first fixed frame;
    a second fixed frame, each of the first fixed frame and the second fixed frame being made of 304 stainless steel plate with 4 mm thickness and the second fixed frame having a third frame end and a fourth frame end;
    the first frame end of the first fixed frame and the third frame end of the second fixed frame is machined with first and second mounting holes, each with a center distance of 40 mm and a diameter of 10 mm, the first and second mounting holes are used to fix the sensor unit to the spray boom through a plurality of bolts; and
    third and fourth mounting holes machined at the second frame end of the first fixed frame and the fourth frame end of the second fixed frame, the third and fourth mounting holes are positioned 70 mm from the center and 10 mm in diameter;
    wherein the angle adjusting mechanism positioned through the third and fourth mounting holes is bolted to the second fixed frame.

4. The real-time measuring system according to claim 2 wherein the angle adjusting mechanism includes at least four "L" type bending members;
    a plurality of fifth sensor mounting holes with 30 mm diameter positioned on a first end of each of the bending members with at least four ultrasonic distance sensors installed in each of the plurality of fifth sensor mounting holes;
    a plurality of sixth sensor mounting holes at a second end of each of the bending members with 10 mm diameter, the fixed frame being affixed to the plurality of sixth sensor mounting holes with bolts; and
    wherein when adjusting the angle between the first and second ultrasonic ranging sensors, a second lock nut is loosened and then rotated about the angle adjusting mechanism and the angle adjusting mechanism is locked by the second lock nut after an angle between the first and second ultrasonic ranging sensors is adjusted to target value.

5. The real-time measuring system according to claim 1 further comprising:
    a control unit comprises a controller, an analog data acquisition module, wherein the controller and the analog data acquisition module are configured for parallel communication; and
    a first ultrasonic ranging sensor, a second ultrasonic ranging sensor, a third ultrasonic ranging sensor, a fourth ultrasonic ranging sensor, a USB flash disk, a touch screen, a DC booster module and a 12 V DC power;
    wherein the controller connected with the touch screen by a RS485 interface, the touch screen connects with the USB flash disk; and the 12 V DC power connects with the controller through the DC booster module and provides power for the analog data acquisition module; and
    wherein four A/D conversion interfaces are linked to four ultrasonic ranging sensors, respectively.

6. A real-time height measuring method for a spray boom relative to a crop canopy comprising:
    calibrating ultrasonic ranging sensors according to a practical measured height data within a certain range from a measured spray boom to a crop canopy, the ultrasonic ranging sensors comprising first, second, third, and fourth ultrasonic ranging sensors;

determining an included angle between two of the ultrasonic ranging sensors;

collecting a relative height between the spray boom and the crop canopy, the first, second, third, and fourth ultrasonic ranging sensors being directed at a plurality of crop rows; wherein a different wind speed and walking speed, different planting density and two different kinds of crops in which a first kind is a slender crop comprising wheat or rice and a second kind is a broad leaf crop comprising corn or soybean;

initiating a control unit, storing the relative height from the spray boom to the crop canopy in a USB flash disk for subsequent anti-interference processing to data, as well as a first measurement of crop canopy height using artificial measurement and a second measurement of the crop canopy height using manual measurement;

recording the first measurement and the second measurement;

processing the relative height, the first measurement, and the second measurement for anti-interference comprising applying limit range filtering, median filtering and sliding average filtering; wherein data collected due to any interference is removed to obtain reliable and real effective data; and calculating the relative height from the spray boom to the crop canopy.

7. The real-time height measuring method for the spray boom relative to the crop canopy of claim 6, further comprising transforming the collected data by the ultrasonic ranging sensors into a relative height between the spray boom and the crop canopy as follows:

$$h1 = S1 \cos\alpha = S2 \cos(\alpha - \theta) \quad (1)$$

$$h2 = S3 \cos\alpha = S4 \cos(\alpha + \theta) \quad (2)$$

where θ is an angle between two sensors; a is a tilt angle of the spray boom; S1 S2, S3, and S4 are valid data from the first, second, third, and fourth ultrasonic ranging sensors respectively; h1 and h2 are a relative height of canopy to left and right ends of spray boom respectively;

determining the tilt angle by $$\alpha = \arctan\frac{S2\cos\theta - S1}{S2\sin\theta} \text{ or} \quad (3)$$

$$\alpha = \arctan\frac{S3 - S4\cos\theta}{S4\sin\theta}; \quad (4)$$

and substituting equations (3) and (4) into equations (1) and (2), wherein the values of h1 and h2 are defined as $$h1 = S1 \cos\alpha$$

$$h2 = S3 \cos\alpha.$$

8. The real-time height measuring method for the spray boom relative to the crop canopy of claim 6, the calibrating of the ultrasonic ranging sensors further comprising:

calibrating the ultrasonic ranging sensors on a shelf bracket, respectively;

placing the shelf bracket on a horizontal ground so that the ultrasonic ranging sensors are perpendicular to a vertical wall;

adjusting a first adjusted distance between an ultrasonic transmission terminal of the ultrasonic ranging sensors and a vertical metope at 10 mm intervals from 200 mm until 800 mm, and simultaneously recording the first adjusted distance from the ultrasonic transmission terminal of the ultrasonic ranging sensors to the vertical metope;

adjusting a second adjusted distance between an ultrasonic transmission terminal of the ultrasonic ranging sensors and the vertical metope at 10 mm intervals from 800 mm until 200 mm, and simultaneously recording the second adjusted distance from the ultrasonic transmission terminal of the ultrasonic ranging sensors to the vertical metope;

averaging the first adjusted distance and second adjusted distance, a fitting data is obtained;

fitting the data was conducted, with minimum variance, by using the fitting data; and verifying a fitting equation by data point selecting randomly in 200-800 mm, wherein a minimum and a maximum errors were 0 mm and 6 mm, respectively.

9. The real-time height measuring method for the spray boom relative to the crop canopy of claim 7, further comprising:

fixing the first, second, third and fourth ultrasonic ranging sensors on the spray boom, respectively; wherein the ultrasonic ranging sensors are aligned with a flat cement pavement;

measuring a first distance from a lower end face of the ultrasonic ranging sensors to the flat cement pavement;

storing the first distance in the control unit and the USB flash disk;

displaying the first distance on a touch screen;

observing the first distance on the touch screen;

comparing a second distance manually measured with a tape measure to the first distance to validate the ultrasonic ranging sensors; and wherein if the second distance is not equal to the first distance, increasing an angle between any two of the ultrasonic ranging sensors while maintaining an angle between centerlines of the two of the ultrasonic ranging sensors until the first distance from the two of the ultrasonic ranging sensors matches the second distance and, in response, locking the angle adjusting mechanism by use of a lock nut.

* * * * *